Dec. 16, 1969          L. VACCA ET AL          3,484,175
MEANS AND METHOD OF SYNCHRONOUS FOLDING HELICOPTER BLADES
Filed Oct. 12, 1967                          5 Sheets-Sheet 1
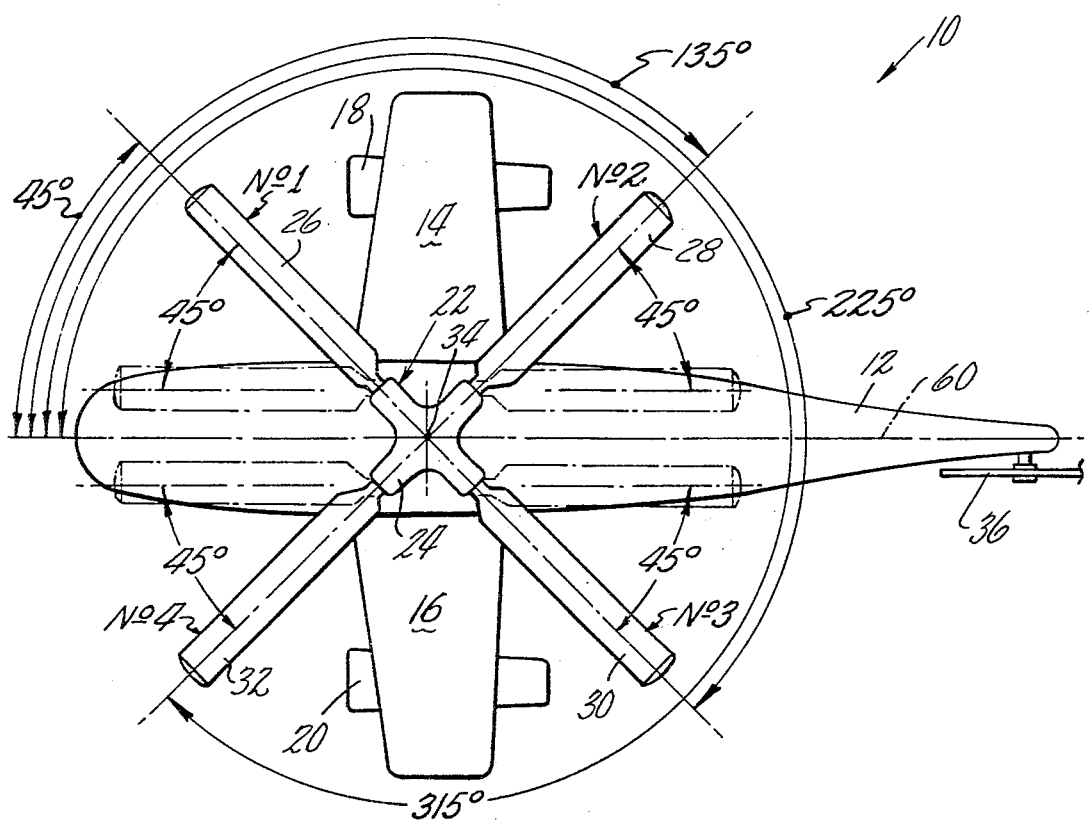
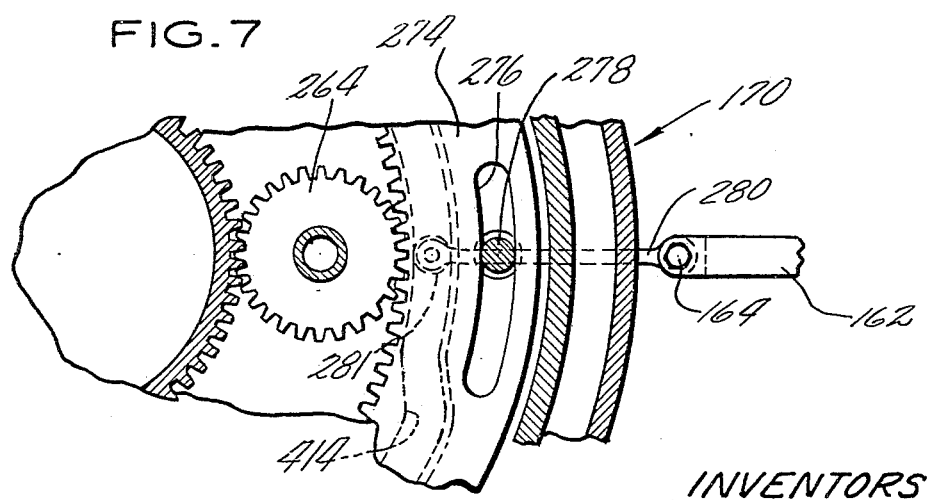
INVENTORS
LUIGI VACCA
DONALD L. FERRIS
BY Vernon F. Hauschild
ATTORNEY

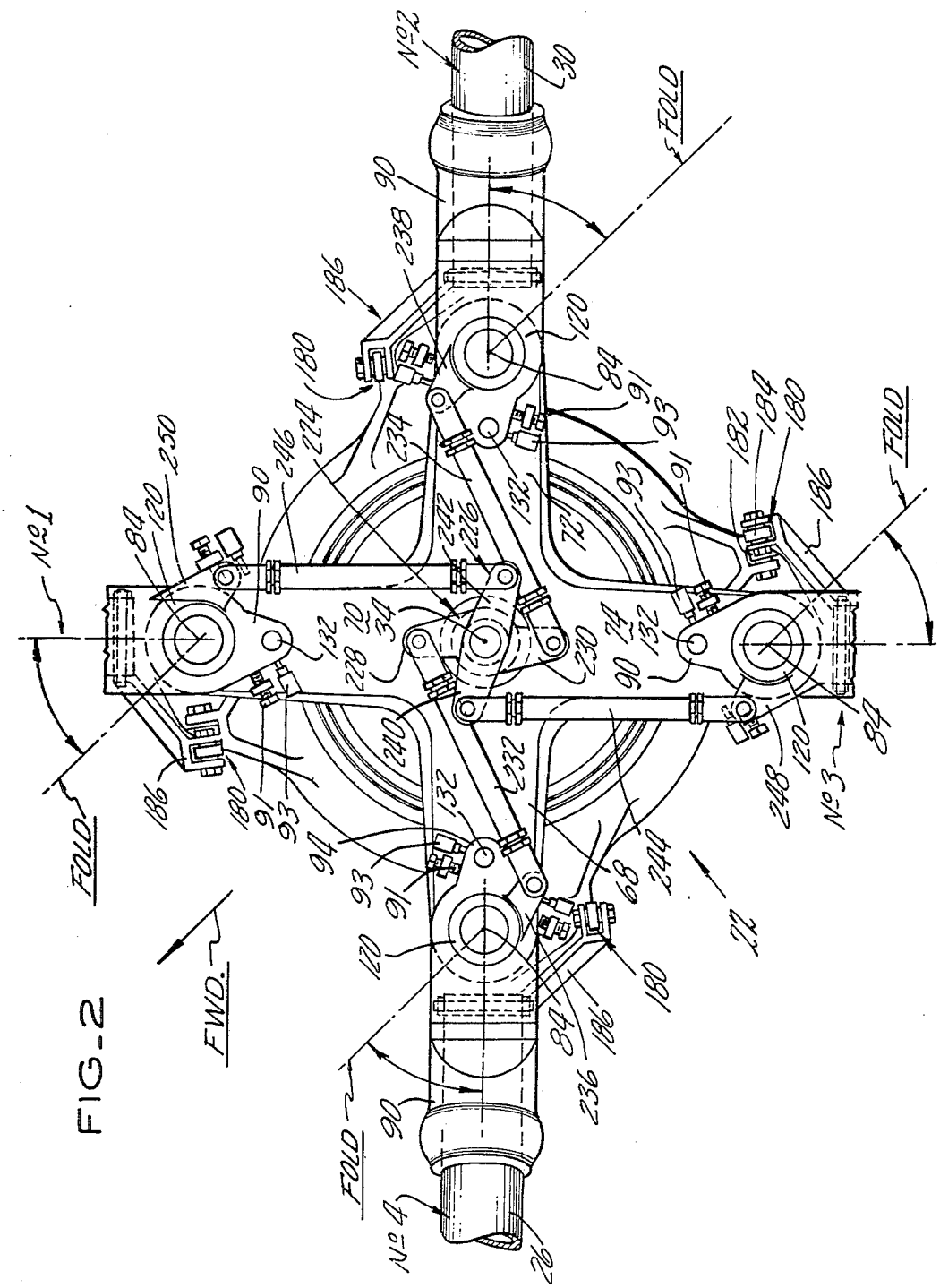

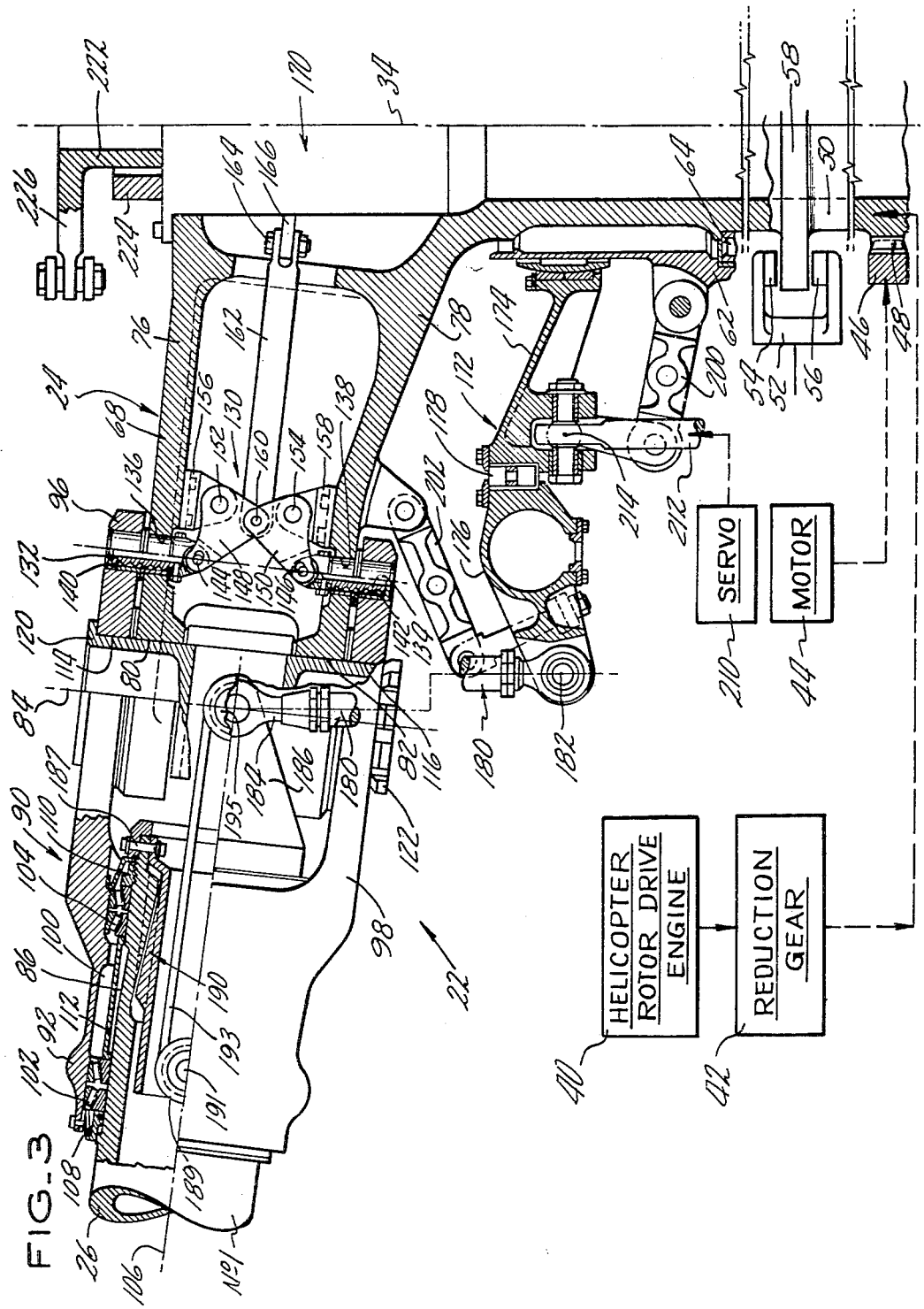

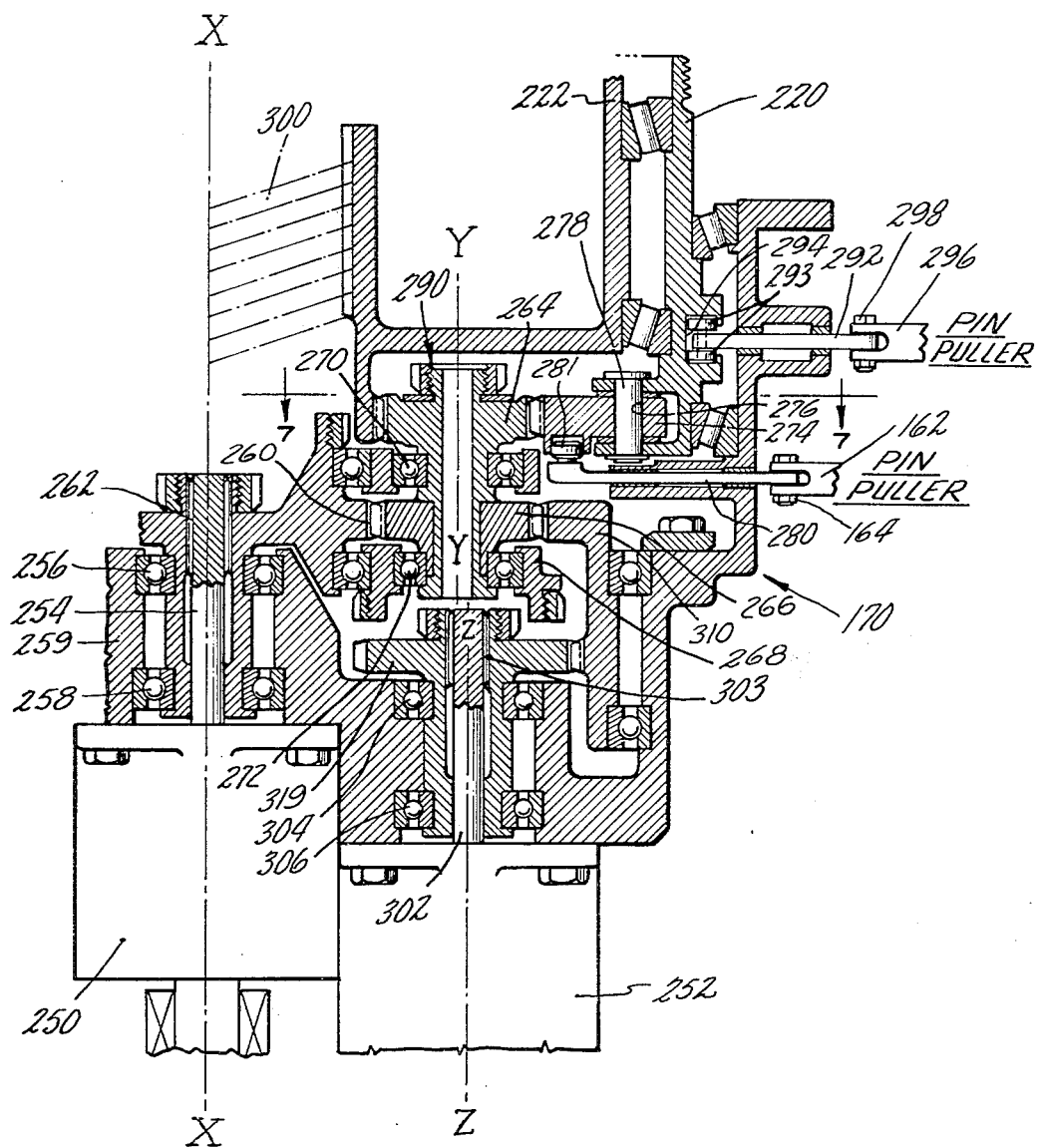

United States Patent Office 3,484,175
Patented Dec. 16, 1969

3,484,175
MEANS AND METHOD OF SYNCHRONOUSLY FOLDING HELICOPTER BLADES
Luigi Vacca, Milford, and Donald L. Ferris, Newtown, Conn., assignors to United Aircraft Corporation, East Hartford, Conn., a corporation of Delaware
Filed Oct. 12, 1967, Ser. No. 674,882
Int. Cl. B64c 27/50
U.S. Cl. 416—143     25 Claims

ABSTRACT OF THE DISCLOSURE

The blades of a helicopter rotor are attached to the rotor hub so as to be foldable with respect thereto and are provided with mechanism to synchronously fold the blades with respect to the remainder of the rotor hub either simultaneously or in sequence.

Background of the invention

This invention relates to helicopters having lift rotors with foldable blades and more particularly to such rotors in which the blades are adapted to be folded in flight in a convertiplane application so as to present minimum adverse effect on aircraft stability during folding, to present minimum likelihood of blade-to-blade or blade-to-fuselage interference during folding, and to present minimum drag in the folded position.

In the prior art, the blades of helicopter rotors have been folded to aid the storability of the helicoper in hangers or in storage wells of aircraft carriers and the like but under these conditions, the blade folding takes place either manually as taught in U.S. Patent No. 3,101,785 or by some powered means such as hydraulically as taught in U.S. Patents Nos. 2,925,130 and 3,097,701. With the advent of the convertiplane, that is, an aircraft which is capable of flying in two modes of operations, such as a fixed wing aircraft and as a helicopter, the requirement for folding the helicopter blades in flight has arisen. Convertiplanes are particularly helpful in situations such as personnel retrieval in battle zones wherein it is necessary to get to the site of the downed aircraft and personnel rapidly and hence it is desirable to utilize a fixed-wing mode of operation during this portion of the mission. However, once the aircraft has arrived at the side of the downed aircraft and personnel, because there is no landing area, it is desirable to be able to operate in the helicopter mode so as to hover over and retrieve the personnel and/or the downed aircraft while in the helicopter mode. After such retrieval, and in preparation for the return to the home base, it is desirable to convert to the fixed-wing mode for more rapid travel. It will accordingly be seen that while the fixed-wing mode of operation provides the most rapid form of transit, it has the disadvantage of requiring a suitable landing strip. Contrary to this, while the helicopter is not capable of flying at the forward speeds which a fixed-wing aircraft can attain, the helicopter is capable of hovering over fixed places to retrieve downed personnel and aircraft without the requirement for landing. There are incompatibilities between the two modes of travel, however, in that if the helicopter rotor is left in its extended or operable position during fixed-wing operation, this helicopter rotor will create substantial drag and it is therefore very necessary that the blades of the helicopter be foldable to a minimum drag position and that the rotor then be either stowed as taught in U.S. application Ser. No. 467,910, entitled "Convertiplane" by Ray D. Leoni, filed June 29, 1965, or covered by some sort of a sliding door canopy.

During transition between the helicopter mode of operation and the fixed-wing mode of operation it is important that the helicopter rotor create minimum aircraft instability. It is accordingly a teaching of this invention to provide a helicopter rotor with foldable blades, which rotor is stopped in flight during the helicopter-to-fixed-wing mode of operation so as to present symmetric blade patterns on the opposite sides of the fore-and-aft helicopter centerline and wherein the helicopter blades are folded either simultaneously or sequentially so that this symmetric pattern is maintained at all times during this conversion from helicopter to fixed-wing mode.

While convertiplanes having foldable helicopter blades are known in the prior art, for example, in U.S. Patent No. 3,050,274, the prior art does not teach such a helicopter rotor in which the blades form a symmetric blade pattern on opposite sides of the helicopter fore-and-aft centerline and are foldable either simultaneously or sequentially to maintain such symmetric blade patterns throughout the blade folding operation.

Summary of the invention

A primary object of the present invention is to provide a helicopter rotor in which all blades are foldable and capable of being folded in flight and still further wherein the helicopter rotor may be stopped in flight and selectively positioned to present symmetric patterns of helicopter blades on opposite sides of the fore-and-aft centerline of the helicopter and wherein the blades are foldable synchronously, either in unison or sequentially, so that symmetric blade patterns are maintained on opposite sides of that centerline during the entire blade folding operation and when the blades are in their folded position.

It is still a further object of this invention to teach a helicopter rotor in which the blades are normally locked against folding with respect to the rotor hub assembly and which includes mechanism to sequentially unlock and then fold the blades as described above.

In accordance with the present invention, a helicopter rotor having four equally spaced blades may be stopped in flight and selectively positioned so that the first helicopter blade is positioned at the 45° azimuth position with respect to the helicopter fore-and-aft centerline and so that the second, third and fourth helicopter blades are progressively positioned 90° therefrom and from each other. In addition, all blades may be synchronously folded between their operating or extended position and a folded position parallel to said helicopter fore-and-aft centerline either in unison or sequentially while maintaining symmetric blade patterns on opposite sides of said centerline throughout the folding operation.

It is still a further object of this invention to teach such a helicopter rotor wherein the blades are supported from a rotor hub assembly in such a fashion that the blades are connected to the hub to permit pitch variation thereof and are also connected to the hub to permit folding therebetween and, further, wherein the pitch variation connection is farther from tha axis of rotation of the hub assembly than is the blade fold hinge so that the blades are capable of pure pitch variation motion by conventional actuation when in their stowed position.

It is still a further object of this invention to teach apparatus and method to perform such blade folding without blade-to-blade or blade-to-fuselage interference during folding.

It is still a further object of this invention to teach such multi-helicopter rotor blade system and blade fold actuation mechanism wherein minimum blade folding actuation force is required because the blades which are being folded, synchronously and simultaneously, are being acted upon differently by the relative wind during flight to produce substantially cancelling wind effect on the blades, regardless of wind direction and direction of flight vehicle travel.

It is still a further object of this invention to teach such a blade fold system in which all blades are folded by a single actuator.

It is still a further object of this invention to teach such a helicopter rotor with foldable blades wherein the blades are foldable a selected number of degrees, about a blade fold axis of selected attitude and, further, wherein the blades may be moved in pure pitch change motion when stowed so as to present minimum drag which the blades are in their stowed position.

Brief description of the drawing

FIG. 1 is a plan view of a convertiplane utilizing this invention.

FIG. 2 is a plan view of a helicopter rotor head utilizing this invention.

FIG. 3 is a cross-sectional elevation view of a helicopter rotor head utilizing this invention.

FIG. 6 is a cross-sectional showing of the drive mechanism of the blade fold actuator.

FIG. 7 is a section through line 7—7 of FIG. 6.

Description of the preferred embodiment

Figure 4:
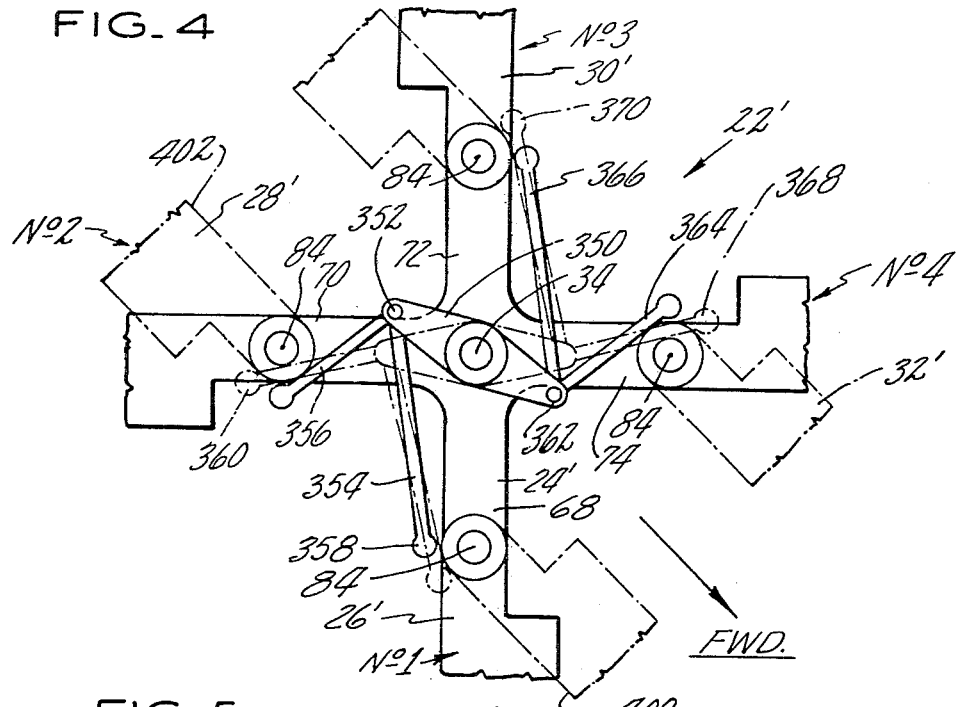
FIG. 4 is a plan vew of a modificaton of the blade fold actuator.

Referring to FIG. 1 we see convertiplane 10 which is capable of both the helicopter mode of operation and the fixed-wing mode of operation and conversion therebetween in flight. Convertiplane 10 comprises fuselage 12, opposed fixed wings 14 and 16, which may support piston, turboprop or turbojet engines 18 and 20. Helicopter lift rotor 22 projects upwardly from and is supported for rotation by fuselage 12 and includes hub assembly 24 from which blades 26, 28, 30 and 32 project for rotation therewith about axis of rotation 34. These helicopter blades are mounted on hub assembly 24 so as to be foldable with respect thereto between their operable position shown in solid lines in FIG. 1 and their folded or stowed position shown in phantom lines in FIG. 1. Anti-torque rotor 36 rotates in cooperation with helicopter lift rotor 22 to combat the torque imposed upon fuselage 12 by rotor 22.

When convertiplane 10 is operating in the fixed-wing mode of operation, helicopter rotor 22 is in its stowed position shown in phantom lines in FIG. 1 and the retracted helicopter rotor is covered in some way by appropriate canopy arrangements to present minimum drag as engines 18 and 20 serve to provide the forward propulsive force for fixed-wing operation. Engines 18 and 20 may also be mounted in fuselage 12.

During helicopter mode of operation of convertiplane 10, the helicopter lift rotor 22 has its blades 26–32 unfolded to their operable position shown in solid lines in FIG. 1 and rotor 22 is then driven either by appropriate connections with engines 18 and/or 20 or by a third engine 40 illustrated schematically in FIG. 3 and shown to be coacting with reduction gear 42. Engine 40 and reduction gear 42 may be of any appropriate type, for example, of the type shown in U.S. Patents Nos. 2,711,631, 2,747,367, 2,426,879 and 2,979,968.

This invention is particularly concerned with the helicopter lift rotor and has particular applicability to smooth transition between the helicopter mode of operation and the fixed-wing mode of operation in flight. This requirement occurs, for example, when convertiplane 10 has been operating in helicopter mode while making a rescue recovery and then wishes to return at a rapid rate to a base area. During this helicopter-to-fixed-wing mode transition, a combination of helicopter blade pitch variation and rotor braking are employed to bring rotor 22 to a stopped position. With rotor 22 stopped, motor 44 (see FIG. 3), through rack 46 and gear 48 which is a ring gear forming a part of rotor drive shaft 50, drives rotor 22 to the position shown in solid lines in FIG. 1. Disc-brake assembly 52, which includes pucks 54 and 56 which are solenoid operated by the pilot to bear against brake ring 58 which projects from and may form part of rotor shaft 50, then positively positions rotor 22 in its FIG. 1 solid lines position. It is important to note that with the helicopter rotor 22 in this stopped selected position, the centerline of blade 26 forms substantially a 45° angle of azimuth with the helicopter fore-and-aft centerline 60, while blade 28 forms an azimuth angle of 135° therewith, while blade 30 forms an azimuth angle of 225° therewith, and while blade 32 forms an azimuth angle of 315° therewith.

Blades 26–32 will hereinafter be referred to as blades 1–4, respectively.

It will be noted that with blades 1–4 in their solid line FIG. 1 position, a symmetric blade pattern is presented on opposite sides of helicopter fore-and-aft centerline 60 and it will be noted that, as is fully described hereinafter, this symmetric blade pattern on opposite sides of centerline 60 remains as blades 1–4 are moved from their operable position shown in solid lines in FIG. 1 and their stowed position shown in phantom lines in FIG. 1. As described hereinafter, blades 1–4 fold synchronously through an angle of 45°, either in unison or sequentially in diametrically opposed pairs, between their operating condition and their folded condition. It will further be noted that blades 1 and 3 rotate in the same arcuate direction while blades 2 and 4 rotate in the same arcuate direction but the opposite arcuate direction from blades 1 and 3. This continuous symmetric blade pattern during transition is important so as not to adversely affect the stability of convertiplane 10.

Experience has shown that while leaving helicopter rotor 22 in its operable position during fixed-wing mode would indeed cause substantial drag on convertiplane 10, the instability which would be caused by folding three of the four blades at a time when the folding mechanism for the fourth blade was inoperative could indeed cause such severe stability problems that it would be preferable to leave all four blades in operable position. Accordingly, it is an important teaching of this invention to provide mechanism and method which will present symmetric blade patterns on opposite sides of the helicopter centerline 60 during all phases of conversion and in which all helicopter blades will fold synchronously either in unison or selectively in diametrically opposed pairs.

By viewing FIG. 1, it will be noted that blades #1 and #3 fold from their FIG. 1 solid line position in a counterclockwise direction to their FIG. 1 phantom position, while blades #2 and #4 fold in a clockwise direction from their FIG. 1 solid line position to their FIG. 1 phantom position. Accordingly, blades #1 and #4 fold in opposite rotary directions forward of axis 34 while blades #2 and #3 fold in opposite rotary directions aft of axis 34.

Referring to FIGS. 2 and 3 we see helicopter lift rotor 22 in greater particularity. Rotor 22 is driven in rotation about axis 34 by an appropriate engine 40 and drives rotor drive shaft 50 through reduction gearing 42. Shaft 50 is mounted for rotation about axis 34 in conventional fashion in reduction gear box housing or helicopter mast 62, which is supported by fuselage 12 and which carries spaced bearings, such as bearings 64, between reduction gear box housing or mast 62 and drive shaft 50, to support shaft 50 and hence rotor 22 concentrically for rotation about axis 34. Rotor 22 includes hub assembly 24, which projects from and which may be made integral with drive shaft 50 and which includes four equally spaced arm members 68, 70, 72 and 74 projecting radially therefrom with respect to axis 34. Each arm member 68–74, as best shown in FIG. 3, includes an upper plate member 76 and a lower plate member 78 which have aligned apertures 80 and 82 therein. Apertures 80 and 82 are concentric about blade fold axis 84. Each of blades 26–32 includes a substantially circular blade root attachment section 86 shown best in FIG. 3.

Folding sleeves 90 connect blades 26–32 to arm members 68–74. Each folding sleeve 90 includes an outer end 92 of substantially circular cross section and a bifurcated inner end 94 which includes top plate 96 and bottom plate 98. Outer end 92 envelops cylindrical blade root attachment section 86 to form annular aperture 100 therebetween. Anti-friction bearings 102 and 104 extend between these two members to support the blades for rotation about pitch change or feathering axis 106. Retainers 108 and 110 coact with bearings 102 and 104 and spacer 112 to retain blades 26–32 in position within folding sleeves 90. Bifurcated arms 96 and 98 of sleeve 90 include aligned apertures 114 and 116, which are concentric about blade fold axis 84 and in alignment with aligned apertures 80 and 82 of hub assembly arms 76 and 78 to receive blade fold hinge pin 120 therethrough. Nut 122 holds hinge pin 120 within apertures 80, 82, 114 and 116. It will therefore be seen that blades 26–32 are free to pivot about blade fold axis 84 with respect to hub assembly 24 between their operable and stowed positions shown in FIG. 1.

Blade anti-fold locking means 130 is provided in each arm member 68–74 to prevent blade folding when blade folding is not desired. Lock units 130 include pin members 132 and 134 which may be inserted into aligned apertures 136 and 138 of plate members such as 76 and 78 and apertures 140 and 142 of folding sleeve members 96 and 98. Retaining pins 132 and 134 are pivotally connected at pivot connections 144 and 146 to crank members 148 and 150 respectively. Crank members 148 and 150 are, in turn, connected at pivot points 152 and 154 to lug members 156 and 158 which are attached to plate members such as 76 and 78. Crank members 148 and 150 are also pivotally connected at pivot point 160 to actuator link 162, which link is pivotally connected at its opposite end on blade fold actuator 170. Blade fold actuator 170, which will be described in greater particularity hereinafter in connection with FIG. 6, is mounted within hub assembly 24 concentrically about axis 34. It will therefore be seen that as actuator arm 162 is caused to translate, pins 132 and 134 may be caused to either be inserted into or withdrawn from apertures 140 and 142 of folding sleeve 90 so as to either lock the blades 26–32 from folding pivot action with respect to hub assembly 24 or to permit such folding action.

In conventional fashion, and as best shown in FIGS. 2 and 3, the pitch of blades 26–32 may be caused to vary collectively or cyclically by the use of swash plate assembly 172. Swash plate assembly 172 comprises nonrotating section 174 and rotating section 176, which are joined by ring bearing 178. Pitch change link 180 is pivotally connected at its opposite ends 182 and 184 to swash plate assembly 172 and pitch change horn 186, which extends from and which is connected to blades 26–32. Pitch change horn 186 is connected to blades 1 through 4 by a ring of bolts 187. Connector 190 is fastened to the inside of the blade through the same set of bolts. At the outboard end of the connector 190 a spool 189 is bolted by a pin 191. A tension-torsion strap 193 is attached over the spool and around a like spool 195 at the hinge pin 120. This tension-torsion strap is used to take out the centrifugal force of blades and acts in place of a series of stack bearings between sleeve 90 and blades 1 through 4.

Accordingly, motion of swash plate assembly 172 will cause pitch change motion of blades 26–32 due to the connection therebetween through pitch change links 180. As best shown in FIG. 3, stationary scissors 200 are pivotally connected to the reduction gear box housing 62 and to the swash plate nonrotating section 174 to prevent rotation of section 174. Rotating scissors 202 are pivotally connected to hub assembly 24 and the rotating swash plate section 176 to cause that section of the swash plate to rotate with the hub assembly. At least three in-line servos 210, of conventional hydraulic cylinder-piston design are provided to actuate the same number of swash plate tilt links 212, which are pivotally attached to the stationary portion 174 of swash plate assembly 172 at pivot point 214. Accordingly, in conventional fashion, when all in-line servos 210 are actuated in unison, swash plate 172 is caused to either raise or lower without tilting on reduction gear box housing 62 so as to collectively vary the pitch of blades 26–32 in unison. Also in conventional fashion, if the three or more in-line servos 210 are actuated independently of one another or different amounts, swash plate 172 will tilt, thereby providing cyclic blade pitch variation.

As previously stated, the purpose of this invention is to provide means and method for folding the helicopter blades relative to the remainder of the helicopter rotor in such a fashion that the stability of the aircraft is adversely affected minimally during the in-flight blade folding operation and wherein the folded blades present minimum drag. It is an important teaching of this invention that the helicopter blades be folded such that at all times during the folding process a symmetric blade pattern is presented on opposite sides of the fore-and-aft centerline of the helicopter. This can be done by either synchronously folding the blades simultaneously and in unison or by sequentially folding selected pairs of blades. There are some helicopter rotor configurations in which blade lead-lag and flapping motion is minimal wherein there is no danger of blade-to-blade or blade-to-fuselage interference if all blades are folded synchronously and in unison and the actuators for such systems will be discussed hereinafter in connection with the discussion of the actuator embodiments shown in FIGS. 4 and 5. There are other helicopter rotor assemblies, however, in which the blades are sufficiently susceptible to both flapping and lead-lag and other motions due to the aerodynamic loading thereof during folding that either blade-to-blade or blade-to-fuselage interference could be expected and therefore it is deemed desirable to fold diametrically opposed blades in synchronization but sequentially. The blade folding mechanism shown in FIGS. 2 and 3 is of the latter variety and will now be described.

Blade fold actuator 170, the operation of which will be described hereinafter in connection with FIG. 6 is positioned within hub assembly 24 and concentrically about axis 34 and for rotation with hub assembly 24. Actuator 170 serves to drive output shafts 220 and 222, which carry actuator heads 224 and 226, respectively. As best shown in FIG. 2, actuator head 224 has oppositely projecting lobes 228 and 230 which are pivotally connected to blade fold link or rods 232 and 234, respectively. Rods 232 and 234 are pivotally connected at their opposite ends to blade fold projections 236 and 238 extending from the folding sleeves 90 of blades #2 and #4, respectively. It will accordingly be seen that when actuator head 224 is rotated in a counterclockwise direction as shown in FIG. 2, fold rods 232 and 234 will act through blade fold lugs 236 and 238 to synchronously fold blades #2 and #4 between their FIG. 1 solid line operating position to their FIG. 1 phantom line folded positions.

In similar fashion, actuator head 226 has oppositely directed lobes 240 and 242, which pivotally connect at their opposite ends to blade fold links 244 and 246, respectively. Links 244 and 246 pivotally connect to the blade fold ears 248 and 250 being part of folding sleeve 90 of blades #3 and #1, respectively. It will accordingly be seen that as actuator 226 is caused to rotate counterclockwise as shown in FIG. 2, blades #1 and #3 will be caused to fold synchronously. Obviously, clockwise direction of actuators 224 and 226 will cause the respective blades to move from their folded to their operable position. It will be observed that with the blade folding actuation system shown in FIGS. 2 and 3, blades #1 and #3 may be folded independently and sequentially with respect to blades #2 and #4.

Bearing in mind the blade fold actuation system just described in connection with FIGS. 2 and 3, it will be noted by observing FIG. 1 that with such an actuation system, blades #2 and #4 can be synchronously folded to their stowed position and that, thereafter, once blades #2 and #4 are folded and stowed, blades #1 and #3 may then be synchronously folded to their folded position. In this fashion, there will be no blade overlapping due to blade flexibility and other motions during the blade folding process and hence blade damage during in-flight folding will be eliminated.

With respect to the stowed position of the rotor blades, by proper selection of the location and attitude of the folding axis 84 and the number of degrees through which the blades fold, the blades may be selectively positioned in the desired stowed position. In our FIG. 2 and FIG. 3 blade fold construction, we control the angle through which the blades move in folding by providing adjustable position stops 91 and microswitch 93 on the rotor hub (see FIG. 2).

In addition to control of the location and attitude of the blade fold axis 84 and the number of degrees through which the blades move in folding, it is often of assistance in snugly stowing blades to be able to produce a motion in the stowed blades which constitutes a pitch change motion only. This is possible through the usual pitch change mechanisms, that is, the swash plate 172 and connecting links 180 so long as the feathering axis 84 are positioned closer to axis of rotation 34 than are the pitch change connections between the blade and the hub shown at bearings 102 and 104 of FIG. 3. This particular positioning of the fold axis and the pitch change connection between the blades and the hubs is another advantage of this invention, since it permits pure pitch change motion of the blades when in their stowed positions.

FIG. 6 shows our preferred embodiment of the mechanism for causing the blade fold mechanism of FIGS. 2 and 3 to operate so as to sequentially unlock and fold blade pairs. The FIG. 6 actuator system is actually redundant in that it may be driven either by input motor 250 or 252. In operation, input motor 250 causes shaft 254, which is supported for rotation by bearings 256 and 258 within housing 259, to rotate about axis of rotation X—X. Sun gear 260, which is either integral with or splined to rotating shaft 254 by spline 262, is also caused to rotate about axis X—X. This rotation of sun gear 260 causes a plurality of planetary gears, each of which includes two gears such as 264 and 266, to rotate about their own axis Y-X, and also in planetary fashion about axis X—X. Planetary gears 264 and 266 are carried in cage 268, which supports bearings 270 and 272. The rotation of planetary gears 264 and 268 will cause ring gear 274 to commence to rotate about axis X—X because output shaft 222 is still locked in position by pins 132 and 134, respectively. This rotation of ring gear 274 is initially permitted for a selective number of degrees because ring gear 274 includes circumferential slot 276 (see FIG. 7) through which pin 278 passes to form a lost motion connection between ring gear 274 and output shaft 220. Accordingly, ring gear 274 is free to rotate through a few degrees before it begins to drive output shaft 220. During the first few degrees of rotation, ring gear 274 actuates lock mechanism 130 (FIG. 3) for blades #2 and #4 through spring loaded plunger 280 which is pivotally connected to pin puller link 162 at 164. The plunger 280 carries a roller 281 which is retained in contoured cam ring 414. Ring 414 is attached to ring gear 274 by any convenient connecting means such as screw 416. As ring gear 274 rotates in its lost motion movement, cam ring 414 causes plunger 280 to translate link 162 and actuate the pin retraction mechanisms 130 of blades #2 and #4 to unlock these blades for folding. After blades #2 and #4 are unlocked, pin 278 bottoms against the end of circumferential slot 276 in ring gear 274, thereby causing output shaft 220 to rotate with ring gear 274 so as to cause link actuator 224 to rotate and cooperate with blade fold links 232 and 234 to fold blades #2 and #4 to their stowed position (FIG. 1). It will therefore be seen that input motor 250 of FIG. 6 drives a planetary gear system indicated generally as 290 to first pull the lock pins of blades #2 and #4 and then fold those blades while blades #1 and #3 remain in their unfolded or operable FIG. 1 solid line position.

Still viewing FIG. 6 it will be noted that plunger member 292 attached to double cam roller 293 is received in cam slot 294 of shaft 220 and this cam slot is selectively contoured so that the rotation of output shaft 220, after folding blades #2 and 4# will act upon pin puller plunger 292 so as to pull the lock pins of blade lock mechanisms 130 of blades #1 and #3 through the co-action of pin puller link 296 which is pivotally attached thereto at pivot point 298. Pin puller link 296 is connected to blade lock units 130 for blades #1 and #3 and serves to unlock those blades for blade folding. With blades #1 and #3 so unlocked, and with output shaft 220 and ring gear 274 stationary because blades #2 and #4 are now stowed, planetary gear system 290 now drives output shaft 222, which is attached to blade fold actuator member 226 and thereby causes rotation thereof. Member 226, through fold links 244 and 246, will cause blades #1 and #3 to fold synchronously to their stowed position shown in FIG. 1.

It will accordingly be seen that the FIG. 6 actuator construction is capable of operating through input 250 so as to sequentially pull the lock pins of blades #2 and #4, then fold blades #2 and #4, then pull the lock pins of blades #1 and #3, and then finally fold blades #1 and #3.

Jackscrew arrangement 300 may be threadably attached to the inner diameter of shaft 222 and may be used for the purpose of raising or lowering a fairing or canopy which is to cover the rotor head area and which must be removed to permit blade unfolding. Jackscrew 300 can be used to produce either a rotary output or a linear output in conventional position. The fairing is lowered as the last two blades #1 and #3 are folded and covers the rotor head area. The fairing is raised as the first two blades are unfolded.

As mentioned previously, blade folding actuator 170 is redundant and, in addition to being actuatable by input motor 250 is also actuatable by input motor 252. These two motors act separately in a truly redundant system and are not cooperative in that they coact. Under the circumstance where input motor 252 is being utilized, shaft member 302 is caused to rotate about axis Z—Z, which shaft member is supported for rotation within housing 170 by bearings 304 and 306. Shaft 302 carries gear member 319 therewith, connected by spline 303 which gear drives the planetary gears such as 264 and 266 through ring gear 310. These planetary gears 264 and 266 then act through ring gear 274 in the same fashion as described above in connection with input system 250 so as to sequentially pull the pins of blades #2 and #4, then fold blade #2 and #4, hen pull the pins of blades #1 and #3 and, finally, fold blades #1 and #3.

If it is desired to mount gears 274 and 266 for relative motion, it is necessary to provide braking means for motors 250 and 252. The brake would be applied to the inoperative motor in order to fix its associated gear and allow cage 268 to carry gear 264 around axis X—X.

Referring to FIG. 4 we see an embodiment of this rotor head invention with blade fold provisions wherein all four blades synchronously fold simultaneously. In the FIG. 4 construction, rotor hub 24' includes equally spaced arm members 68-74. In conventional fashion, blades 26'-32' are pivotally connected thereto at flapping hinge 84. Pivotable actuator 350 is supported on hub 24' for pivotal motion relative thereto and can be driven in any convenient fashion such as by an electric motor driven rack and gear arrangement (not shown). The first end 352 of actuator 350 is pivotally connected to links 354 and 356 whose other ends are, in turn, pivotally connected to blades #1 and #2, respectively, at pivot points 358 and 360. The other end 362 of actuator 350 is pivotally connected to links 364 and 366, which are in turn pivotally connected at their opposite ends at pivot points 368 and 370 to blades #4 and #3, respectively. It will accordingly be seen that with the arrangement shown in FIG. 4, rotation of actuator 350 in a counterclockwise direction will cause blades 1, 2, 3 and 4 to fold simultaneously and in synchronization and that rotation of link 350 in a clockwise direction will cause all four blades to unfold and come to their operable position simultaneously and in synchronization.

In connection with FIG. 4, it should be noted that links 354 and 356 are connected to blades #1 and #2 so that these blades are caused to fold in opposite directions of rotation. More specifically, since link 354 connects to blade #1 at a point opposite fold axis 84 from leading edge 400 and link 356 connects to blade #2 at a point on the same side of fold axis 84 as leading edge 402, the rotation of actuator 350 will fold blades #1 and #2 in opposite rotary directions.

Links 364 and 366 are similarly so connected to blades #4 and #3 so that these blades fold in opposite rotary directions. It will therefore be seen that blades #2 and #3 fold toward one another aft of axis 34 while blades #1 and #4 fold toward one another forward of axis 34.

Figure 5:
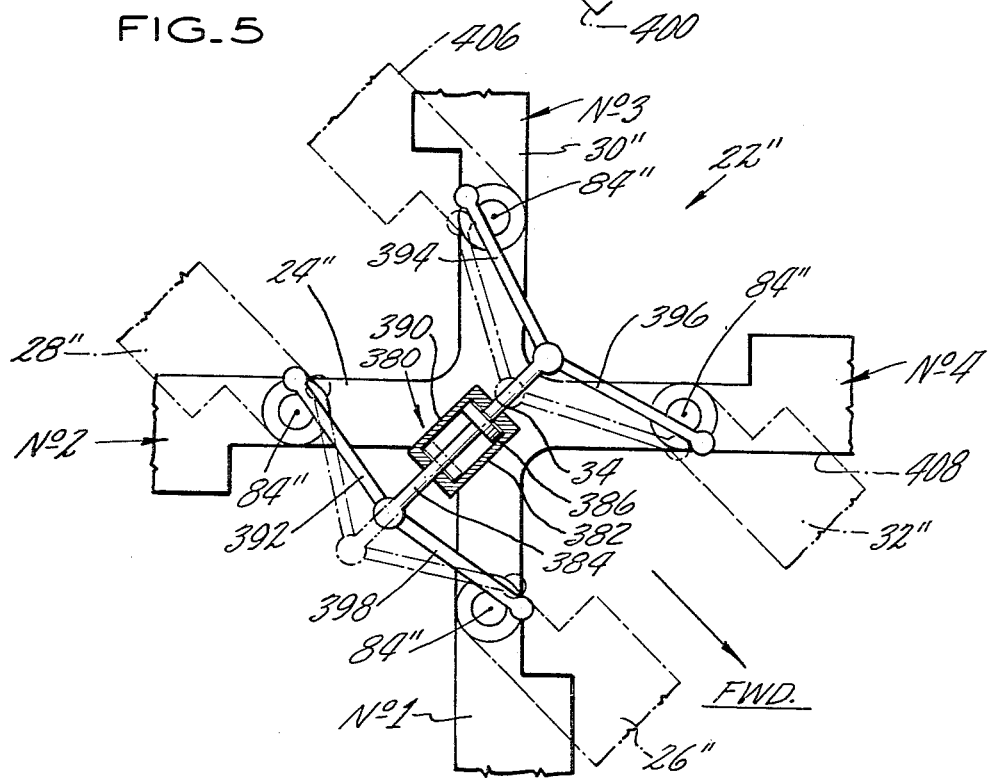
FIG. 5 is still another modification of the blade fold actuator.

Referring to FIG. 5 we see another embodiment of the blade fold actuator which accomplishes simultaneous, synchronous folding of all four blades of the helicopter rotor. In this rotor configuration, blades #1-4 are pivotally attached to rotor hub assembly 24" about fold axes 84" in the same fashion as in the previous construction. The blade fold actuation system 380 includes a piston-cylinder assembly 382, which may be either hydraulically or pneumatically actuated in either direction in conventional fashion, so as to cause rod 384, which extends in opposite direction from both sides of piston 386 to reciprocate between its end positions of travel as determined by the amount of travel and location of piston 386 within cylinder 390. Links 392, 394, 396 and 398 are pivotally attached as shown in pairs to opposite ends of rod 384 and are pivotally attached at their opposite ends to blades #2, #3, #4 and #1, respectively. In the FIG. 5 construction, when actuator 380 is in its phantom line position, all four blades are in their folded position as shown in phantom lines, whereas, when actuator 380 is in its solid line position, all four blades are in their operable or extended position as shown in solid lines. It will accordingly be seen that the FIG. 5 actuator 380 in the FIG. 5 rotor construction is capable of folding all four blades simultaneously and in synchronization.

It will be noted that blades #3 and #4 are caused to fold in opposite rotary directions since links 394 and 396 pivotally attached thereto on opposite sides of the fold axis 84" from the blade leading edges, 406 and 408, respectively. The same relationship exists between links 392 and 398 and blades #2 and #1 so as to cause these two blades to fold in opposite rotary directions. Accordingly, in the FIG. 5 construction, blades #1 and #4 fold toward one another forward of axis 34 and blades #2 and #3 fold toward one another aft of axis 34. Since these blades fold synchronously and in unison, a symmetric blade pattern is maintained on opposite sides of the helicopter centerline at all times during the folding process.

Operation

In operation, our convertiplane 10 shown in FIG. 1 would take off in its fixed-wing mode of operation with the helicopter rotor 22 in its stowed position. To convert from the fixed-wing mode of operation to the helicoptor mode of operation, the canopy or fairing covering the stowed rotor (not shown) would first be removed by any convenient mechanism, such as the jackscrew arrangement 300 shown in FIG. 6, and the helicopter blades could then be actuated by means of any of the actuation systems, such as the system shown in FIG. 6 to their operable positions and then locked by locking mechanism 130 against folding with respect to rotor hub assembly 24. During this portion of the operation brake member 52 would probably be used to hold rotor 22 in fixed position. With the rotor blades so extended, helicopter rotor drive engine 40, acting through reduction gear 42 would be caused to drive rotor 22 once brake 52 was released. If engines 18 and 22 were performing no function with respect to the driving of helicopter rotor 22, these engines would preferably be stopped.

In converting from the helicopter mode of operation to the fixed-wing mode of operation, the power is transferred from rotor 22 to conventional engines 18 and 20. Rotor 22 is brought to a stop by blade pitch variation or braking, or both, in conventional fashion. With the rotor so stopped, auxiliary motor 44, through rack and gear 46-48, would cause rotor 22 to rotate to its FIG. 1 solid line position so as to present symmetric blade patterns on opposite sides of the helicopter centerline 60. In this FIG. 1 solid line operable position, it will be noted that blades #1 and #4 are at equal arcuate distances on opposite sides of axis 60 and projecting in a generally forward direction while blades #2 and #3 are at equal arcuate distances on opposite sides of axis 60 and projecting in a generally rearward direction. This provides us with the aforementioned symmetric blade pattern. Whether the blades are to be folded by the actuation system shown in FIGS. 2 and 3, or by the actuation systems shown in FIGS. 4 or 5, the four blades will always be brought to the FIG. 1 solid line position initially in the fashion just described.

If all blades are to be synchronously folded simultaneously using the FIG. 4 actuator construction, actuator 350 will be caused to rotate in a counterclockwise direction so as to synchronously fold all blades simultaneously.

If the blade fold actuator 380 of FIG. 5 is to be used, piston 386 and link or rod 384 will be hydraulically or pneumatically translated to its phantom line position of FIG. 5, there synchronously folding all blades simultaneously.

If, on the other hand, diametrically opposed pairs of blades are to be synchronously folded in sequence, the fold mechanism illustrated in FIGS. 2, 3 and 6 will be used, wherein actuator 170 first pulls the pins of blades #1 and #4 and then causes actuator 224 to rotate in a counterclockwise direction to fold the blades #2 and #4. With blades #2 and #4 so folded, actuator 170 then pulls the pins of blades #1 and #3 and then folds them by counterclockwise rotation of actuator 226. It will be noted that when using the FIGS. 2, 3 and 6 actuator, blade pair #2 and #4 first fold in synchronization and are stowed while blade pair #1 and #3 remain extended. Since there are two such blades presenting a uniform blade pattern at all times, the aircraft stability is not adversely affected thereby. After the second pair of blades #1 and #3 are stowed, the helicopter is then in its FIG. 1 phantom line, stowed position and, after any required pure blade pitch motion to place the blades in a better stowed position, the canopy or other fairing may be used to cover the stowed blades so as to reduce aircraft drag.

We claim:
1. A helicopter rotor including:
 (a) a hub assembly mounted for rotation,

(b) a plurality of helicopter blades, (c) means pivotally connecting said blades to said hub assembly to permit blade pitch change variation, (d) means pivotally connecting said blades to said hub assembly to permit folding of said blades with respect to said hub, (e) locking means locking said blades to said hub assembly to prevent blade folding, (f) means to release said locking means to permit folding of said blades with respect to said hub assembly, (g) means connected to each of said blades to fold said plurality of blades in synchronization with respect to said hub assembly so that when folded half of said blades extend from said hub assembly in a first direction and the remainder of said blades extend from said hub assembly in a second direction opposite to said first direction.

2. Apparatus according to claim 1 and wherein said hub assembly and each of said blades includes apertures which are aligned when said blades are operable and further having lock means including a pin member extending through said aligned apertures in said hub assembly and said blades and still further including a crank member actuatable to cause said pins to extend into or be retracted from said aligned apertures.

3. A helicopter rotor including:

(a) a hub assembly mounted for rotation, (b) a first plurality of helicopter blades, (c) a second plurality of helicopter blades, (d) means pivotally connecting said blades to said hub assembly to permit blade pitch change variation, (e) means pivotally connecting said blades to said hub assembly to permit folding of said blades with respect to said hub, (f) a first locking means locking the blades of said first blade plurality to said hub assembly to prevent blade folding, (g) a second locking means locking the blades of said second blade plurality to said hub assembly to prevent blade folding, (h) means to release said first locking means to permit folding of said blades of said first blade plurality with respect to said hub assembly, (i) means to synchronously fold the blades of said first plurality with said second lock means operation, (j) means to release said second locking means to permit folding of said blades of said second blade plurality with respect to said hub assembly, (k) and means to synchronously fold the blades of said second plurality with the blades of said first plurality already folded.

4. A helicopter rotor including:

(a) a hub assembly mounted for rotation about an axis and having:

(1) four equally spaced arm members extending therefrom radially to said axis for rotation therewith, (b) four helicopter blades, (c) first means connecting one of said blades to each of said arm members for relative blade pitch-change motion therebetween, (d) second means connecting one of said blades to each of said arm members to permit pivot motion therebetween so that said blades may each be folded with respect to said hub assembly between an operating and a stowed position, (e) first means to cause two of said blades to fold in synchronization with respect to said hub assembly from said operating to said stowed position while the other two of said blades remain in said operating position, (f) and second means to cause the other two of said blades to fold in synchronization with respect to said hub assembly.

5. A helicopter rotor including:

(a) a hub assembly mounted for rotation about an axis having:

(1) four equally spaced arms extending therefrom for rotation therewith, (b) four helicopter blades, (c) first means connecting one of said blades to each of said arm members for relative blade pitch-change motion therebetween, (d) second means connecting one of said blades to each of said arm members to permit pivot motion therebetween so that said blades may each be folded with respect to said hub assembly between an operable and folded position, (e) means locking each of said blades in position with respect to said arm members of said hub assembly to prevent blade folding, (f) means connected to two of said blades to first release said lock means with respect to said two blades and then fold said two blades with respect to said rotor in synchronization between an operable and folded position while the other two blades remain locked in position, (g) and second means to unlock said other two blades and to fold said other two blades with respect to said hub assembly in synchronization between an operable and folded position while said first two blades remain in their folded position.

6. Apparatus according to claim 5 and wherein said first two blades are attached to diametrically opposed arm members of said hub assembly and said other two blades are attached to the other two diametrically opposed arm members of said hub assembly.

7. Apparatus according to claim 6 and including a blade folding actuator positioned in said hub assembly and connected to said first and second blade folding means to actuate said first and second blade folding means in sequence and synchronization.

8. A helicopter rotor including:

(a) a hub assembly mounted for rotation about an axis and having:

(1) four equally spaced arm members extending therefrom radial to said axis for rotation, (b) four helicopter blades, (c) first means connecting one of said blades to each of said arm members for relative blade pitch-change motion therebetween, (d) second means connecting one of said blades to each of said arm members to permit pivot motion therebetween so that said blades may each be folded with respect to said hub assembly between an operating and a stowed position, (e) means to stop said rotor in flight and selectively position said rotor so that the first of said blades is positioned in the 45° azimuth position relative to the fore-and-aft centerline of the helicopter which this helicopter rotor is adapted to be used with and in which the second, third and fourth of said blades are successively positioned 90° in azimuth therefrom and from each other, (f) first means to cause two of said blades to fold in synchronization with respect to said hub assembly from said operating to said stowed position while the other two of said blades remain in said operating position, (g) and second means to cause the other two of said blades to fold in synchronization with respect to said hub assembly from said operating to said stowed position while said first two of said blades remain in said stowed position.

9. Apparatus according to claim 4 wherein said second connecting means is located closer to said axis of rotation of said hub assembly than is said first connecting means.

10. A helicopter rotor including:
(a) a hub assembly mounted for rotation about an axis of rotation,
(b) four helicopter blades, each having a folding lug projecting therefrom,
(c) a fold hinge pivotally connecting each of said helicopter blades to said hub assembly to join each blade to said hub in pivot relation to permit blade folding with respect to said hub assembly,
(d) a first fold actuator including:
 (1) a first member mounted for rotation about said axis of rotation with respect to said hub assembly and having two lobes projecting therefrom,
 (2) link means pivotally connecting each of said lobes to said fold lug on two of said blades so that said two blades fold in synchronization with respect to said hub assembly as said first member rotates with respect to said hub assembly.
(e) and a second fold actuator including:
 (1) a second member mounted for rotation about said axis of rotation and having two lobes projecting therefrom,
 (2) link means pivotally connecting each of said lobes and to said blade fold lugs of the other two of said blades so that the other two of said blades fold in synchronization with respect to said hub assembly as said second member rotates with respect to said hub assembly.

11. Apparatus according to claim 10 and including means to lock each of said blades against folding with respect to said hub assembly.

12. Apparatus according to claim 10 and wherein said first and second fold actuators operate independently.

13. A helicopter rotor including:
(a) a hub assembly mounted for rotation and including four equally spaced arm members extending therefrom and having upper and lower plate members with aligned apertures in the outer region thereof,
(b) four helicopter blades having substantially cylindrical inner ends, and also having blade fold lugs projecting therefrom,
(c) connecting means connecting each of said helicopter blades to one of said arm members of said hub assembly and including a first cylindrical end enveloping said cylindrical end of one of said blades and a second bifurcated end enveloping said upper and lower plates of said arm member and including apertures aligned with said aligned apertures of said upper and lower plates,
(d) means supporting said blade cylindrical portion from said connecting means cylindrical end so that said blade is supported from said hub assembly to permit pitch change rotation therebetween,
(e) a fold hinge pin extending through said aligned apertures in each of said arm members and said bifurcated end of said connecting means to coact therewith to form a blade-fold hinge joint to pivotally connect each of said blades to said hub assembly to permit said blades to fold between an operable and folded position,
(f) anti-fold lock means locking each of said connecting means to said hub assembly to prevent blade folding,
(g) a first fold actuator including:
 (1) a first member mounted for rotation about said axis of rotation with respect to said hub assembly and having two lobes projecting therefrom,
 (2) link means pivotally connecting each of said lobes to said lugs on two of said blades so as to cause said two of said blades to fold with respect to said hub assembly in synchronization as said first member rotates relative to said hub assembly,
(h) a second fold actuator including:
 (1) a second member mounted for rotation about said axis of rotation with respect to said hub assembly and having two lobes projecting therefrom,
 (2) link means pivotally connecting each of said lobes to said blade-fold lugs of the other two of said blades so as to cause the other two of said blades to fold with respect to said hub assembly in synchronization as said second member rotates relative to said assembly.

14. A helicopter rotor including:
(a) a hub assembly mounted for rotation and including arm members extending radially therefrom,
(b) a plurality of helicopter blades each having a substantially cylindrical root attachment section,
(c) connecting means connecting said blades to said arm members and including a first cylindrical end adapted to support said cylindrical root attachment section of said blade to permit blade pitch variation and further including a second section positioned closer to said axis of rotation of said hub assembly than said cylindrical end and having one or more apertures positioned to align with said apertures of said arm members,
(d) a blade fold hinge pin extending through said aligned apertures of said connecting means and said arm members to effect a pivotal connection therebetween to permit blade folding with respect to said hub assembly,
(e) and means to cause each of said blades to fold in synchronization with all other blades with respect to said hub assembly so that when folded half of said blades extend from said hub assembly in a first direction and the remainder of said blades extend from said hub assembly in a second direction opposite to said first direction.

15. Apparatus according to claim 14 and including means to lock said blades with respect to said arm members to prevent blade folding, and further including means to cause said locking means to release said blades for folding action and then, sequentially thereafter, to cause said blades to fold in synchronization with respect to said hub assembly.

16. A helicopter having a fore-and-aft centerline extending between the 0° and 180° azimuth of the helicopter and including:
(a) a helicopter lift rotor including:
 (1) a hub assembly mounted for rotation about an axis of rotation and including four equally spaced arm members extending radially from said axis of rotation,
 (2) four helicopter blades,
 (3) means connecting each of said blades to said four arm members so that the blades may be folded with respect thereto between an operating position and a folded position,
 (4) means to lock said blades against folding with respect to said arm members in said operating position,
(b) means to stop said rotor in flight,
(c) means to selectively position said rotor in flight so that the first of said blades is at the 45° azimuth position, the second of said blades is at the 135° azimuth position, the third of said blades is at the 225° azimuth position, and the fourth of said blades is at the 315° azimuth position,
(d) means to unlock said lock means to permit folding of said blades with respect to said hub assembly,
(e) and means to simultneously fold said blades to said folded positions parallel to said fore-and-aft helicopter centerline and so that said first and fourth blades extend forward and so that said second and third blades extend aft.

17. A helicopter having a fore-and-aft centerline extending between the 0° and 180° azimuth of the helicopter and including:
   (a) a helicopter lift rotor including:
      (1) a hub assembly mounted for rotation about an axis of rotation and including four equally spaced arm members extending radially from said axis of rotation,
      (2) four helicopter blades, including a first, second, third and fourth blade,
      (3) means connecting each of said blades to said four arm members so that the blades may be folded with respect thereto between an operating position and a folded position,
      (4) means to lock said blades against folding with respect to said arm members in said operating position,
   (b) means to stop said rotor in flight,
   (c) means to selectively position said rotor in flight so that the first of said blades is at the 45° azimuth position, the second of said blades is at the 135° azimuth position, the third of said blades is at the 225° azimuth position, and the fourth of said blades is at the 315° azimuth position,
   (d) means to unlock said first and third blades for folding,
   (e) means to simultaneously and synchronously fold said first and third blades to their folded positions parallel to said fore-and-aft helicopter centerline,
   (f) means to unlock said second and fourth blades,
   (g) means to simultaneously and synchronously fold said second and fourth blades to their folded positions substantially parallel to said fore-and-aft helicopter centerline.

18. A helicopter having a fore-and-aft centerline and including:
   (a) a lift rotor having:
      (1) a hub mounted for rotation about an axis,
      (2) a plurality of pairs of diametrically opposed helicopter blades projecting from said hub radially with respect to said axis,
      (3) means connecting each of said blades to said hub to permit relative pivotal motion therebetween and hence to permit each of said blades to be folded between an operating position wherein said blades extend radially with respect to said axis and a folded position wherein said blades extend substantially parallel to said helicopter fore-and-aft centerline,
   (b) means to stop said rotor in flight and selectively position said rotor so that said blades form symmetric blade patterns on opposite sides of said helicopter fore-and-aft centerline,
   (c) and means to synchronously fold the blades of each of said blade pairs between said operating and stowed positions and to cause the diametrically opposed blades of the blade pairs to pivot in folding in the same rotary direction of travel and to further cause the blades of the first blade pair to fold in opposite rotary direction of travel from the blades of the second blade pair.

19. A helicopter rotor including:
   (a) a hub assembly mounted for rotation about an axis and having:
      (1) four equally spaced arm members extending therefrom radial to said axis for rotation therewith,
   (b) four helicopter blades,
   (c) means connecting one of said blades to each of said arm members to permit pivot motion about a blade fold axis therebetween so that said blades may each be folded with respect to said hub assembly between an operating and a stowed position,
   (d) blade fold actuating mechanism including:
      (1) a rotatable member mounted on said hub assembly for rotation about said axis,
      (2) link members pivotally connected to said rotatable member and to each of said blades so that said blades will move in blade folding action between said operating and stowed positions as said rotatable member is caused to rotate with respect to said hub assembly and so that two of said blades extend in a first direction when stowed and so that the remaining two blades extend in a second direction opposite to said first direction when stowed.

20. A helicopter rotor including:
   (a) a hub assembly mounted for rotation about an axis and having:
      (1) four equally spaced arm members extending therefrom radial to said axis for rotation therewith,
   (b) four helicopter blades,
   (c) means connecting one of said blades to each of said arm members to permit pivot motion about a blade fold axis therebetween so that said blades may each be folded with respect to said hub assembly between an operating and a stowed position,
   (d) blade fold actuating mechanism including:
      (1) a rotatable member mounted on said hub assembly for rotation about said axis,
      (2) two pairs of links each including two links with each of said links pivotally connected at one of its ends to said rotatable member and at its other end to one of said blades so that as said rotatable member is caused to rotate with respect to said hub assembly, said two link pairs will cause two of said blades to rotate in the same direction as the rotatable member between said operating and stowed positions and so that the other two of said links will rotate in the opposite direction from said rotatable member between said operating and said stowed positions.

21. Apparatus according to claim 20 wherein said link pairs are pivotally connected to each of said four blades in selected locations thereon so that, as said rotatable member rotates two diametrically opposed blades will rotate in folding action in the same direction as said rotatable member and the other two of said blades will rotate in the opposite direction in folding action from said rotatable member.

22. A helicopter rotor including:
   (a) a hub assembly mounted for rotation about an axis and having:
      (1) four equally spaced arm members extending therefrom radial to said axis for rotation therewith,
   (b) four helicopter blades each having a leading edge and a trailing edge,
   (c) means connecting one of said blades to each of said arm members to permit pivot motion about a blade fold axis therebetween so that said blades may each be folded with respect to said hub assembly between an operating and a stowed position,
   (d) a blade fold actuator including:
      (1) a fluid powered piston-cylinder mechanism mounted for rotation with said hub assembly and to permit relative linear two-way motion therebetween,
      (2) shaft means connected to and projecting from opposite ends of said piston-cylinder mechanism for linear motion therewith,
      (3) four link members each pivotally connected to one of said blades and to said shaft means so that said blades are caused to move in pivot motion about said blade fold axis between said operating and stowed positions in response to relative motion of said piston-cylinder mechanism and so that two of said blades extend in a first direction when stowed and so that the remaining two blades extend in a second direction opposite to said first direction when stowed.

23. Apparatus according to claim 22 wherein said four links are divided into link pairs with one end of each link in the first link pair pivotally connected to one end of the shaft means and with one end of each link in the second link pair pivotally connected to the opposite end of said shaft member, and further wherein the other end of each link in each of said pairs are connected pivotally to adjacent blades and on opposite sides of the blade fold axis with respect to the blade leading edge.

24. Apparatus according to claim 23 wherein said piston-cylinder mechanism includes a stationary cylinder and a movable piston and, wherein said rod members are attached to and project from opposite ends of said movable piston for movement therewith.

25. A helicopter rotor including:
   (a) a hub assembly mounted for rotation about an axis and having:
      (1) four equally spaced arm members extending therefrom radial to said axis for rotation therewith,
   (b) four helicopter blades,
   (c) means connecting one of said blades to each of said arm members to permit pivot motion about a blade fold axis therebetween so that said blades may each be folded with respect to said hub assembly between an operating and a stowed position,
   (d) blade fold actuating mechanism including.
      (1) a rotatable member mounted on said hub assembly for rotation about said axis,
      (2) two pairs of links each including two links with each of said links pivotally connected at one of its ends to said rotatable member and at its other end to one of said blades so that as said rotatable member is caused to rotate with respect to said hub assembly, said two link pairs will cause two of said blades to rotate in the same direction as the rotatable member between said operating and stowed positions and so that the other two of said links will rotate in the opposite direction from said rotatable member between said operating and said stowed positions,
      (3) and wherein said link pairs are pivotally connected to each of said four blades in selected locations thereon so that, as said rotatable member rotates two diametrically opposed blades will rotate in folding action in the same direction as said rotatable member and the other two of said blades will rotate in the opposite direction in folding action from said rotatable member,
      (4) and further wherein said rotatable member is symmetric about said axis and includes lobed projections projecting on opposite sides thereof, and wherein each of said link pairs includes two links with one of the ends of the links of each pair being pivotally connected to different lobed projections from said rotating member, and further wherein each of said link pairs includes a first link which is pivotally attached at its other end to a blade at a location on the same side of the blade folding axis as its first end and still further wherein the second link of each link pair is pivotally connected to an adjacent blade at a location on the opposite side of the second blade folding axis from said first end of said second link.

References Cited

UNITED STATES PATENTS

| | | | |
|---|---|---|---|
| 2,738,146 | 3/1956 | Medvedeff | 244—6 |
| 3,153,455 | 10/1964 | Mosinskis | 170—160.12 |
| 3,185,408 | 5/1965 | Higgins | 244—7 |
| 3,187,818 | 6/1965 | Barrett et al. | 170—160.12 |
| 2,925,130 | 2/1960 | Buirid | 170—160.12 |
| 3,097,701 | 7/1963 | Buirid | 170—160.12 |
| 3,247,907 | 4/1966 | Mosinskis | 170—160.12 |

FOREIGN PATENTS 852,841 11/1960 Great Britain.

EVERETTE A. POWELL, Jr., Primary Examiner

U.S. Cl. X.R.

244—7